(12) United States Patent
Henmi et al.

(10) Patent No.: US 12,045,565 B2
(45) Date of Patent: Jul. 23, 2024

(54) INFORMATION PROVISION SYSTEM AND INFORMATION PROVISION METHOD

(71) Applicant: Universal Entertainment Corporation, Tokyo (JP)

(72) Inventors: Takuo Henmi, Tokyo (JP); Junichi Sato, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 322 days.

(21) Appl. No.: 17/594,365

(22) PCT Filed: Mar. 30, 2020

(86) PCT No.: PCT/JP2020/014490
§ 371 (c)(1),
(2) Date: Oct. 13, 2021

(87) PCT Pub. No.: WO2020/213376
PCT Pub. Date: Oct. 22, 2020

(65) Prior Publication Data
US 2022/0207237 A1  Jun. 30, 2022

(30) Foreign Application Priority Data

Apr. 16, 2019 (JP) ................................ 2019-077895

(51) Int. Cl.
*G06F 40/268* (2020.01)
*G06F 16/242* (2019.01)
(Continued)

(52) U.S. Cl.
CPC .......... *G06F 40/268* (2020.01); *G06F 16/243* (2019.01); *G06F 16/3329* (2019.01);
(Continued)

(58) Field of Classification Search
CPC ............... G06F 16/3329; G06F 16/243; G06F 40/268; G06F 40/279; G06F 40/30; G06F 16/3344
See application file for complete search history.

(56) References Cited

U.S. PATENT DOCUMENTS

2007/0022099 A1* 1/2007 Yoshimura .......... G06F 16/3329
2009/0012926 A1* 1/2009 Ishikawa ............. G06F 16/3325
706/47

(Continued)

FOREIGN PATENT DOCUMENTS

JP 2008243024 A 10/2008
JP 2016099968 A 5/2016

*Primary Examiner* — Samuel G Neway
(74) *Attorney, Agent, or Firm* — Simpson & Simpson, PLLC; S. Peter Konzel

(57) ABSTRACT

An object of the present invention is to provide an information provision system and an information provision method by which a user is able to easily acquire desired knowledge data. In an information provision system 1, a suggestion server 400 stores question text strings associated with response contents in advance, receives an input text string input by a user 10 by using a user terminal 100, performs morphological analysis for the input text string and each of the question text strings, calculates a score indicating to what extent each of the question text strings is related to the input text string based on results of the morphological analysis for the question text strings and a result of the morphological analysis for the input text string, and causes the user terminal 100 to display at least one of the question text strings. The score of the at least one of the question text strings satisfies a predetermined condition.

9 Claims, 10 Drawing Sheets

(51) Int. Cl.
 *G06F 16/33* (2019.01)
 *G06F 16/332* (2019.01)
 *G06F 40/279* (2020.01)
 *G06F 40/30* (2020.01)

(52) U.S. Cl.
 CPC ........ *G06F 16/3344* (2019.01); *G06F 40/279* (2020.01); *G06F 40/30* (2020.01)

(56) References Cited

U.S. PATENT DOCUMENTS

| | | | | |
|---|---|---|---|---|
| 2009/0171929 | A1* | 7/2009 | Jing | G06F 16/3322 707/999.005 |
| 2012/0023120 | A1* | 1/2012 | Kanefsky | G06F 16/9535 707/E17.014 |
| 2013/0086509 | A1* | 4/2013 | Satyanarayana | G06F 16/3322 715/781 |
| 2015/0269176 | A1* | 9/2015 | Marantz | G06F 16/90324 707/767 |
| 2015/0324378 | A1* | 11/2015 | Effrat | G06F 16/955 707/706 |
| 2016/0147873 | A1* | 5/2016 | Henmi | G06F 16/90332 707/728 |
| 2017/0242915 | A1* | 8/2017 | Torisawa | G06F 16/3329 |
| 2020/0242144 | A1* | 7/2020 | Yoshida | G06F 16/438 |
| 2022/0207237 | A1* | 6/2022 | Henmi | G06F 40/268 |

* cited by examiner

FIG.7

KNOWLEDGE DATA TABLE

| IDENTIFICATION INFORMATION | QUESTION TEXT STRING | RESPONSE TEXT STRING |
|---|---|---|
| ... | ... | ... |
| 0653 | ARE THERE RECOMMENDED WAYS OF EATING BANANAS? | BAKED BANANA, FROZEN BANANA, ETC |
| 0654 | WAY OF FINDING DELICIOUS BANANAS | DELICIOUS BANANAS HAVE FIRM ROOTS AND |
| 0655 | WHERE WERE BANANAS PRODUCED? | 1st PLACE: INDIA, 2ND PLACE: CHINA |
| ... | ... | ... |

FIG.8

QUESTION DATA TABLE

| IDENTIFICATION INFORMATION | QUESTION TEXT STRING | MORPHEME |
|---|---|---|
| ... | ... | ... |
| 0653 | OISI BANANA NO TABEKATA HA? (i.e., are there recommended ways of eating bananas?) | OISI:ADJECTIVE/BANANA:COMMON NOUN |
| 0654 | OISI BANANA NO MIWAKEKATA, (i.e., how to find delicious bananas?) | OISI:ADJECTIVE/BANANA:COMMON NOUN |
| 0655 | BANANA NO SEISANTI HA? (i.e., where were bananas produced?) | BANANA:COMMON NOUN/NO: NOMINATIVE PARTICLE (kind of words used with subjects of sentences in Japanese) |
| ... | ... | ... |

# INFORMATION PROVISION SYSTEM AND INFORMATION PROVISION METHOD

TECHNICAL FIELD

The present invention relates to an information provision system and an information provision method.

BACKGROUND

A system that finds and returns optimal answers to users' questions has recently been actively researched. In connection with the development of such a system, studies have been carried out for natural language processing and artificial intelligence, in order to analyze the syntax and meaning of a question input by a user and to find an answer to a question.

For example, a question-response system that outputs a candidate of an answer to a question, which is evaluated to be optimal, has been proposed (see Patent Literature 1). In this question-response system, candidates of an answer to a question are found, a score indicating to what extent it is likely that each candidate is the right answer to the question is calculated by utilizing a learning function for each of combinations of the question and the candidates, and a candidate that is most likely to be the right answer to the question is output based on the calculated scores.

Meanwhile, there is a request content identification system which analyzes an input text that is a request from a user written in a natural language, determines whether the content of the request indicated by the input text corresponds to the content of a request defined in advance, and identifies and outputs the content of the request indicated by the input text (see Patent Literature 2).

CITATION LIST

Patent Literatures

[PTL 1] Japanese Unexamined Patent Publication No. 2013-171550
[PTL 2] Japanese Patent No. 5099367

SUMMARY OF THE INVENTION

Technical Problem

In the above-described known system, however, the content of an input by a user may be required to limit the candidates of an answer prepared in advance or may be required to correspond to the content of a request defined in advance. Therefore, some users may not obtain desired response contents.

An object of the present invention is therefore to provide an information provision system and an information provision method by which a user is able to easily acquire desired knowledge data.

Solution to Problem

An information provision system of the present invention includes:
 a question data storage unit configured to store, in advance, question text strings each of which is associated with a response content;
 a receiver which is configured to receive an input text string input by a user by using a user terminal;
 a morphological analysis unit which is configured to perform morphological analysis for the input text string and each of the question text strings;
 a score output unit which is configured to calculate a score indicating to what extent each of the question text strings is related to the input text string, based on results of the morphological analysis for the question text strings and based on a result of the morphological analysis for the input text string; and
 a response display unit which is configured to cause the user terminal to display at least one of the question text strings, the score of the at least one of the question text strings satisfying a predetermined condition.

With this arrangement, the morphological analysis is performed for the input text string input by the user and for the question text strings stored in advance, the score regarding the input text string is calculated for each of the question text strings, and the at least one question text string which satisfies a predetermined condition is displayed on the user terminal. Because of this, even when the user instinctively makes an input without trying to make a request for the system, the user is more likely to acquire a desired response content. As a result, the user is able to easily acquire desired knowledge data.

In information provision system of the present invention, the score output unit may compare the input text string with each of the question text strings in regard to each of plural types of features and may calculate the score from a total value of values each indicating how each of the question text strings is related to the input text string in regard to each of the features.

With this arrangement, each of the values is obtained for each feature by calculating to what extent each of questing text strings influences on the input text string, and the score is obtained from the total value of these values. Therefore, a displayed question text string is more likely to correspond to the content of an input by the user.

In the information provision system of the present invention, update of the input text string by the user may be monitored, each time the input text string is updated, an updated input text string may be sent to the receiver, and each time one of the question text strings is sent from the transmitter, the one of the question text string may be selectably displayed.

With this arrangement, when the user updates an input text string in order to acquire a desired question text string in the user terminal, the morphological analysis is performed for the input text string even when the text string is being input and at least one of the question text strings is selectably displayed as a candidate. Because the meaning of the input text string is compared with the meaning of each of the question text strings for each morpheme, a suitable question text string is more likely to be displayed even when the input text string is being input.

An information provision method of the present invention includes the steps of:
 storing, in advance, question text strings each of which is associated with a response content;
 receiving an input text string input by a user by using a user terminal;
 performing morphological analysis for the input text string and each of the question text strings;
 calculating a score indicating to what extent each of the question text strings is related to the input text string, based on results of the morphological analysis for the question text strings and based on a result of the morphological analysis for the input text string; and causing the user terminal to display at least one of the question text strings, the score of the at least one of the question text strings satisfying a predetermined condition.

With this arrangement, the morphological analysis is performed for the input text string input by the user and for the question text strings stored in advance, the score regarding the input text string is calculated for each of the question text strings, and the at least one question text string which satisfies a predetermined condition is displayed on the user terminal. Because of this, even when the user instinctively makes an input without trying to make a request for the system, the user is more likely to acquire a desired response content. As a result, the user is able to easily acquire desired knowledge data.

BRIEF DESCRIPTION OF DRAWINGS

FIG. 7 illustrates a knowledge data table.

FIG. 8 illustrates a question data table.

PREFERRED EMBODIMENT OF INVENTION

The following will describe an information provision system 1 of one embodiment of the present invention, with reference to figures.

Figure 1:
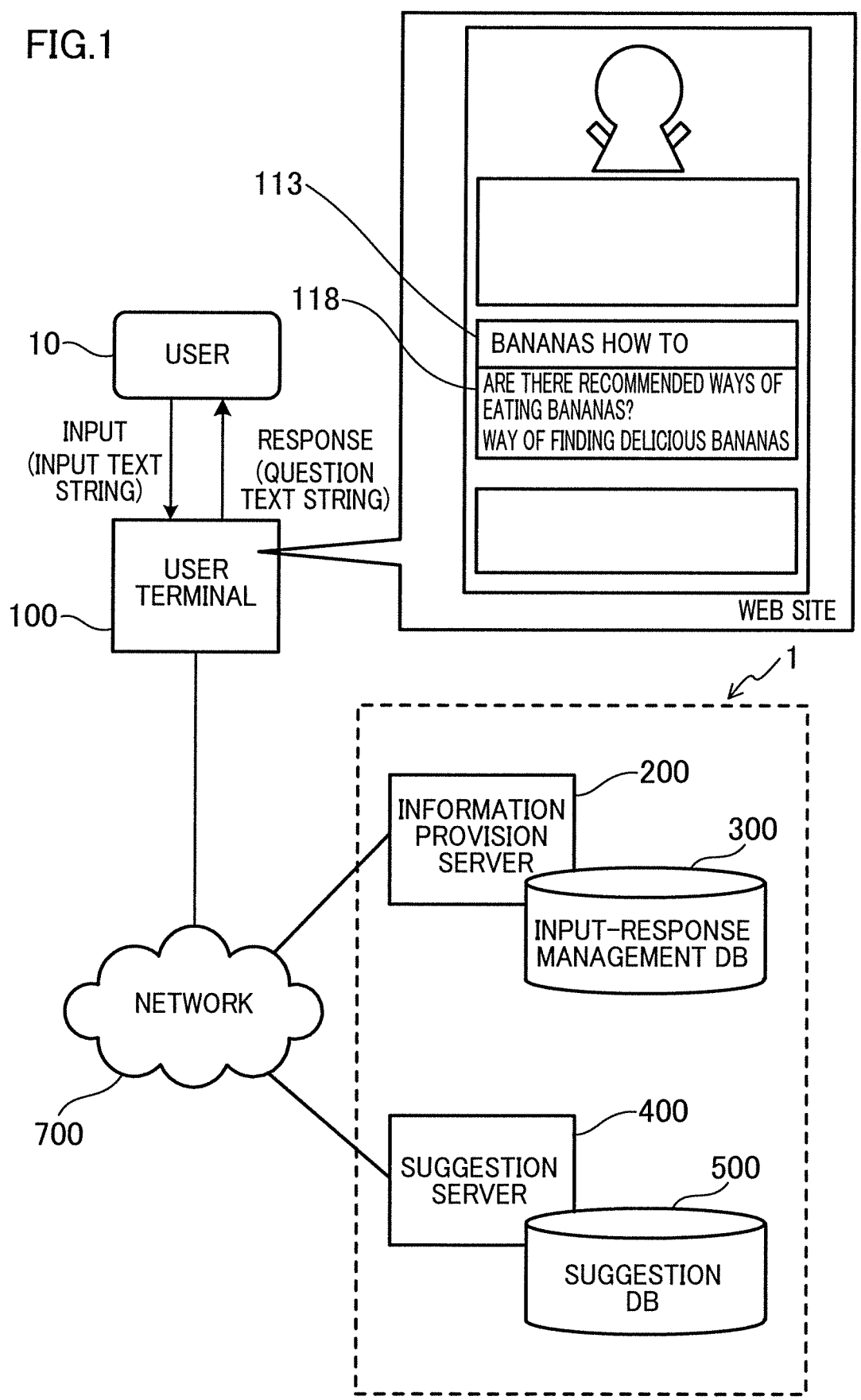
FIG. 1 illustrates the outline of an information provision system.

FIG. 1 illustrates the outline of a system including the information provision system 1 that provides knowledge data in response to an input.

A user 10 inputs a text string (for example, by using a keyboard or a touch panel) into an input area 113 displayed in a predetermined web page on a web browser executed by a user terminal 100. The input text string input from the user terminal 100 operated by the user 10 is typically a sentence (input text). The input text string includes, for example, a question about a product of a company that owns a website including the web page, and is expressed in a natural language. Hereinafter, an input by the user 10 is simply referred to as an "input text string" for the sake of convenience. However, an input text string may not be a sentence and may be one of various types of input text strings including words or a part of a sentence.

The web browser on the user terminal 100 provides an input text string for the information provision system 1 over a network 700. The network 700 is, for example, a network including the Internet.

Upon receiving an input text string from the user terminal 100, the information provision system 1 selects question text strings (typically, answer sentences), which are responses corresponding to this input text string, and sends the question text strings to the user terminal 100 over the network 700. As such, when the user 10 inputs an input text string into the input area of the web page, responses (question text strings) corresponding to this input text string are selectably displayed in a suggestion area 118 of the web page as suggestion words. For example, when the user 10 inputs a question regarding a product into the input area of the web page as an input text string, the information provision system 1 selects some question text strings, contents of which are similar to the content of the input text string among question text strings stored in advance, and sends the selected question text strings to the user terminal 100. The user terminal 100 to which the question text strings are supplied displays these question text strings on, e.g., a response display area of the web page.

Although not illustrated, when the user 10 selects one of the displayed question text strings, the user terminal 100 sends the selected question text string or the information identifying the question text string to the information provision system 1. Upon receiving the selected question text string or the information identifying the question text string, the information provision system 1 sends knowledge data (i.e., an answer) associated with the question text string stored in advance, to the user terminal 100. In addition to a question text sting, the information provision system 1 may send in advance knowledge data associated with that question text string.

In the present embodiment, the user 10 operates the web browser on the user terminal 100 so that an input text string is input or a question text string is displayed. However, the disclosure is not limited to this. For example, other application software may be operated.

As shown in FIG. 1, the information provision system 1 includes a suggestion server 400. In the present embodiment, the information provision system 1 further includes an information provision server 200 in addition to the suggestion server 400. However, the disclosure is not limited to this.

The information provision server 200 includes an input-response management DB 300 including sets of knowledge data. The information provision server 200 selects, by using this input-response management DB 300, each set of knowledge data suitable for a response corresponding to a question text string selected by the user 10 from among question text strings displayed on the user terminal 100, and sends the data to the user terminal 100. In the present embodiment, the information provision system 1 sends response data of an answer text string corresponding to a question text string to the user terminal 100, and displays the text string of this response in the response display area (i.e., response display area displayed in the web page on the web browser executed by the user terminal 100). In other words, the input-response management DB 300 stores answer text strings as sets of knowledge data to correspond to question text strings.

However, the disclosure is not limited to this. The response may be a redirected URL of a web page which shows information suitable for the response. In this case, the web page may be stored in the information provision server 200 or may be stored in an external server. In other words, the input-response management DB 300 stores URLs of web pages showing answers to question text strings in this case. Although not illustrated, the information provision server 200 includes a function of a known question-response system configured to search the input-response management DB 300 by using an input text string input by the user 10 and to provide knowledge data which is a candidate of an answer. In other words, the information provision system 1 including the suggestion server 400 can be used as an additional module which is easily added to the known question-response system. The function of the information provision server 200 and the content of the input-response management DB 300 in the present invention will be detailed later.

The suggestion server 400 includes a suggestion DB 500 functioning as a question data storage unit. Each time the user 10 inputs characters to update an input text string, the user terminal 100 sends an updated input text string to the suggestion server 400. Each time an input text string is supplied from the user terminal 100, the suggestion server 400 refers to the suggestion DB 500 and sends a question text string, the content of which is determined to be similar to the content of the input text string, to the user terminal 100. To be more specific, morphological analysis is performed for the input text string supplied from the user terminal 100, a score indicating to what extent each of question text strings is related to the input text string is calculated based on a result of the morphological analysis for the question text strings stored in advance, and the question text string, the score of which satisfies a predetermined condition, is sent to the user terminal 100.

Upon receiving a question text string supplied from the suggestion server 400, the user terminal 100 displays candidates of the question text string in the lower input area (i.e., input area displayed in the web page on the web browser executed by the user terminal 100) as suggestion words. The function of the suggestion server 400 and the content of the suggestion DB 500 will be detailed later.

In the present embodiment, each time the user 10 makes an input in the user terminal 100 to update an input text string in the input area, an updated input text string is sent to the suggestion server 400. However, the disclosure is not limited to this. For example, the user 10 may perform an input to confirm the input text string. In addition to that, the input text string may be sent to the suggestion server 400 when the input text string is confirmed.

The information provision server 200 and suggestion server 400 of the present embodiment have a function as a web server which sends and receives data under a protocol such as http and by using a web browser executed by the user terminal 100 and a system management terminal 600, and display a predetermined web page on the web browser.

Each of the information provision server 200 and the suggestion server 400 is not necessarily one computer. For example, the suggestion server 400 may be embodied in such a way that the functions of this server are executed by plural computers in a dispersed manner, or may be embodied by one computer. In this regard, the input-response management DB 300 and the suggestion DB 500 may also be embodied in such a way that sets of data stored in these databases are separated in various units and are dispersed in plural sites and computers. In the present embodiment, question text strings stored in the suggestion DB 500 are associated with response contents in the input-response management DB 300. However, the disclosure is not limited to this. In other words, the question text strings associated with the response contents may be stored in one database in advance.

As such, in the information provision system 1 of the present embodiment, the suggestion server 400 stores question text strings associated with response contents in advance, receives an input text string from the user terminal 100 operated by the user 10, performs the morphological analysis for the input text string and each of the question text strings, calculates a score indicating to what extent each of the question text strings is related to the input text string based on results of the morphological analysis for the question text strings and a result of the morphological analysis for the input text string, and causes the user terminal 100 to display a question text string the score of which satisfies a predetermined condition among the question text strings.

With this arrangement, the morphological analysis is performed for an input text string input by a user and for question text strings stored in advance, a score regarding the input text string is calculated for each of the question text strings, and a question text string which satisfies a predetermined condition is displayed on the user terminal 100. Because of this, even when a user instinctively makes an input without taking into account of the requirement of the system, the user is more likely to acquire a desired response content. As a result, a user is able to easily acquire desired knowledge data.

In the information provision system 1 of the present embodiment, the suggestion server 400 compares an input text string with each of question text strings in regard to each of plural types of features and calculates a score from a total value of values each indicating how each question text string is related to the input text string in regard to each feature. The score indicates to what extent each question text string is related to the input text string.

With this arrangement, each of the values is obtained by calculating to what extent each of question text strings is related to an input text string influences on an input text string, and the score is obtained from a total value of these values. Therefore, question text strings, the contents of which correspond to the content of an input by a user, are more likely to be displayed.

Figure 2:
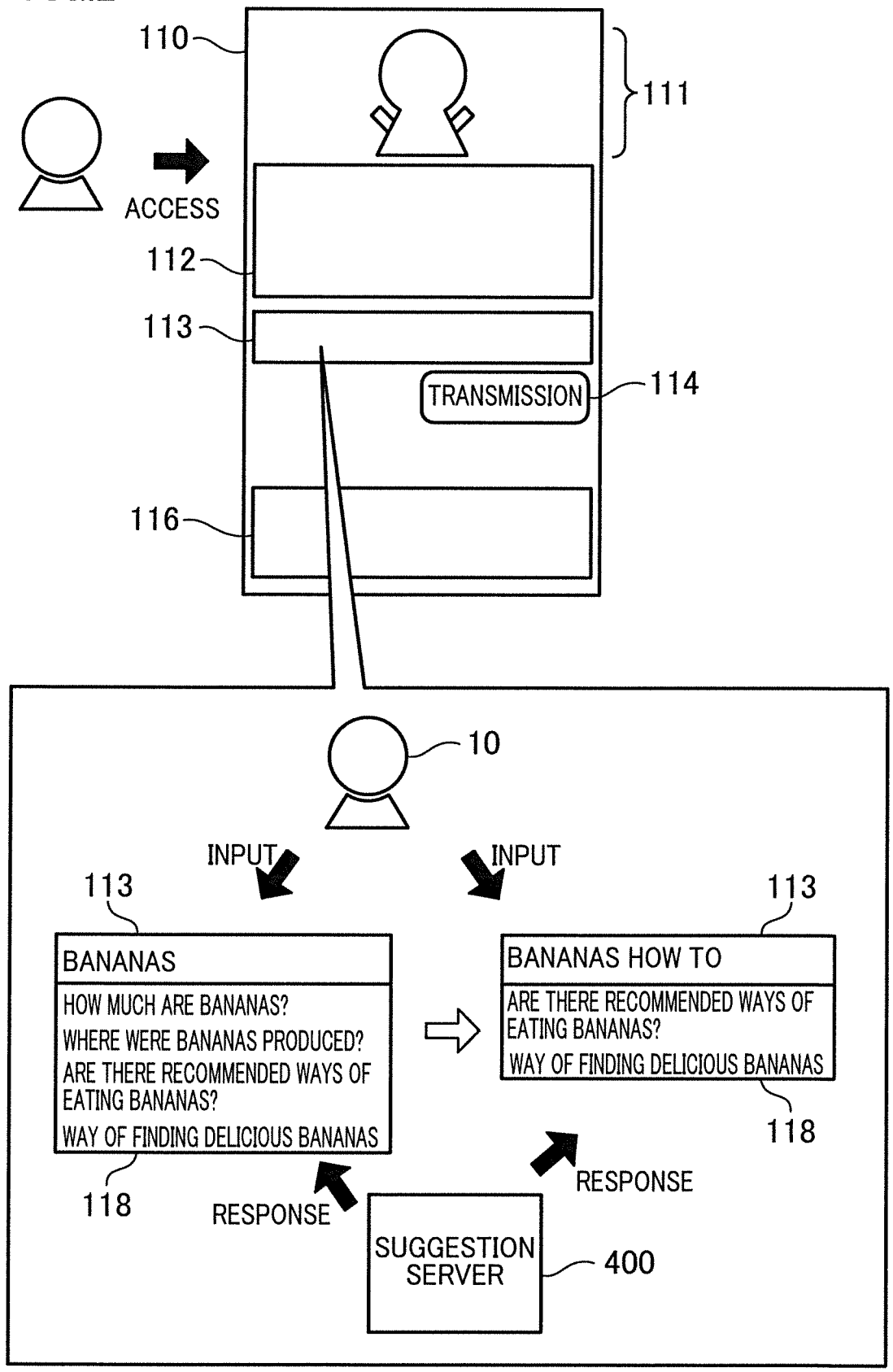
FIG. 2 illustrates the exchange of an input and a response in the information provision system.

FIG. 2 illustrates the exchange of an input and a response between the information provision system 1 of the present embodiment and the user 10.

An input-response screen 110 of FIG. 2 is a web page (or a part of the web page) on the web browser executed by the user terminal 100. The input-response screen 110 may be displayed as one independent window or as a part of a web page.

The input-response screen 110 includes a fictional-character image display area 111, a response display area 112, the input area 113, a transmission button 114, the suggestion area 118, and an information display area 116.

The fictional-character image display area 111 displays fictional-character images, and is able to change a fictional character in accordance with an input content, a response content, etc. For example, the fictional-character display area 111 is able to change the expression of a fictional character in accordance with a response content. The response display area 112 displays a response content output by the information provision system 1.

The input area 113 is an area where the user 10 inputs text strings such as a question. An input text string input in the input area 113 is monitored by, e.g., a script associated with the web page. Each time an input text string in the input area 113 is updated, the input text string is sent to the suggestion server 400. In other words, the information provision system 1 of the present embodiment includes the user terminal 100 which executes a script supplied from the server.

As described above, a question text string is sent from the suggestion server 400, and the user terminal 100 displays the sent question text string in the suggestion area 118. The suggestion area 118 is hidden in an initial state. Only when a question text string is sent from the suggestion server 400, the suggestion area 118 appears. In this regard, when an input by the user 10 is continued and there is no longer a question text string corresponding to an updated input text string, the suggestion area 118 is hidden again. When the user 10 selects a question text string from the suggestion area 118, an input text string input by the user 10 is replaced by the question text string. As a result, this question text string is displayed in the input area 113.

As such, in the information provision system 1, the user terminal 100 (i.e., script) monitors the update of an input text string by the user 10. In addition to that, each time the input text string is updated, the user terminal 100 sends an updated input text string to the suggestion server 400. Each time a question text string is supplied from the user terminal 100, the suggestion server 400 selectably displays the question text string.

With this arrangement, when the user 10 updates an input text string in order to acquire a desired question text string in the user terminal 100, the morphological analysis is performed for the input text string even when the text string is being input and a question text string is selectably displayed as a candidate. Because the meaning of an input text string is compared with meanings of question text strings for each morpheme, a suitable question text string is more likely to be displayed even when the input text string is being input.

The transmission button 114 is provided to transmit an input text string which is input in the input area 113 by operation of the user 10 such as pressing by a mouse, to the information provision server 200. Under a protocol such as http, an input text string is sent to the information provision system 1 over the network 700.

The information display area 116 displays additional information which is added to a response content output by the information provision system 1.

As shown in FIG. 2, the user 10 accesses a web page of the input-response screen 110 at first. In response to this, the information provision server 200 of the information provision system 1 sends sets of HTML data to the user terminal 100. As a result, text strings such as "WELCOME" are displayed in the response display area 112 of the input-response screen 110 as an initial display, and text strings such as "how are the characteristics of a product?" and "how much is a product?" are displayed with links in the information display area 116, as frequently asked questions.

In this regard, the phrases "how are the characteristics of a product?" and "how much is a product?" are provided by the information provision server 200 of the information provision system 1. These text strings are successful responses (i.e., found responses) to inputs which were previously made many times. When the user 10 selects one of the displayed text strings in the information display area 116 by a mouse, etc., the selected text string is automatically sent to the information provision system 1 as an input, with the result that a response to the text string is displayed in the response display area 112.

For example, when the user 10 cannot find a desired question in the information display area 116, the user 10 inputs a question in order to acquire desired knowledge data in the input area 113. After inputting an input text string in the input area 113 or selecting one of question text strings which are displayed in the suggestion area 118 when the input text string is input, the user 10 presses the transmission button 114.

In response to this, when there is knowledge data the content of which corresponds to the content of the input sent from the user terminal 100, the information provision server 200 of the information provision system 1 sends the knowledge data to the user terminal 100. The user terminal 100 then displays the knowledge data in the response display area 112.

The following describes a case where the content of the suggestion area 118 is updated in accordance with the content of an input, which is input in the input area 113 by the user 10, with reference to FIG. 2. As shown in the lower portion of FIG. 2, assume that the user 10 inputs a text string "bananas" in the input area 113 as an input text string. This input text string is sent to the suggestion server 400, and the morphological analysis is performed for this input text string. Subsequently, a question text string, the content of which is determined to be similar to the content of this input text string by the suggestion server 400, is selected and sent to the user terminal 100. The user terminal 100 to which the question text string is supplied causes the suggestion area 118 to appear, and then displays the question text string in the suggestion area 118. In the example of FIG. 2, four candidates, i.e., the phrases "how much are bananas?", "where were bananas produced?", "are there recommended ways of eating bananas?", and "way of finding delicious bananas" are displayed as question text strings in the suggestion area 118.

Subsequently, assume that the user 10 continues to make an input in the input area 113 so that the input text string in the input area 113 is updated to be the text string "bananas how to". This input text string is sent to the suggestion server 400 again, the morphological analysis is performed for this input text string, and a question text string, the content of which is determined to be similar to the content of this input text string by the suggestion server 400, is selected and sent to the user terminal 100. The user terminal 100 to which the question text string is supplied causes the suggestion area 118 to appear, and then displays the question text string in the suggestion area 118. In the example of FIG. 2, two candidates, i.e., the phrases "are there recommended ways of eating bananas?" and "way of finding delicious bananas" are displayed as question text strings in the suggestion area 118.

As such, because a question text string to which knowledge data reliably exists is displayed even in a case where the user 10 instinctively makes an input, the user 10 can easily acquires desired knowledge data.

Figure 3:
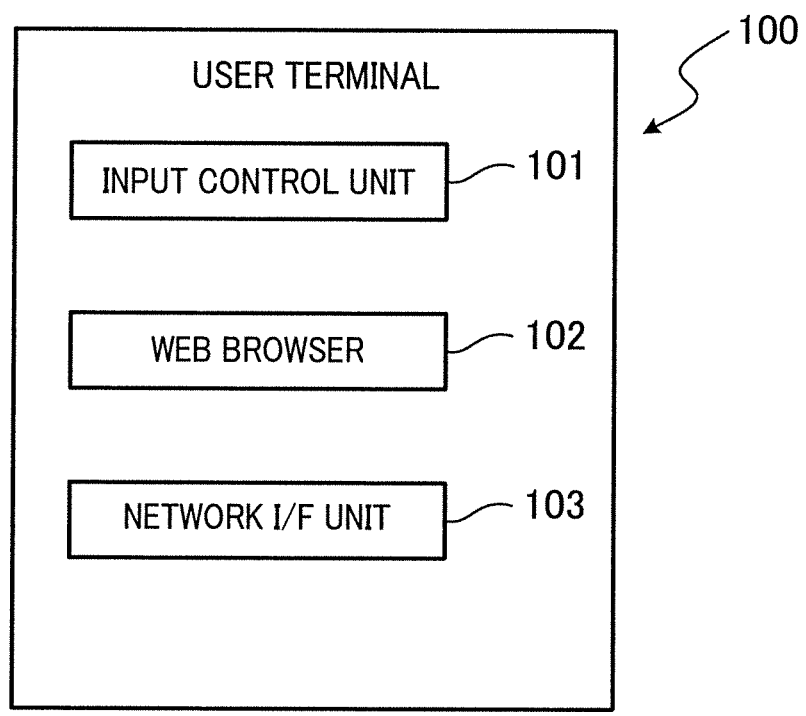
FIG. 3 is a functional block diagram of a user terminal.
Figure 4:
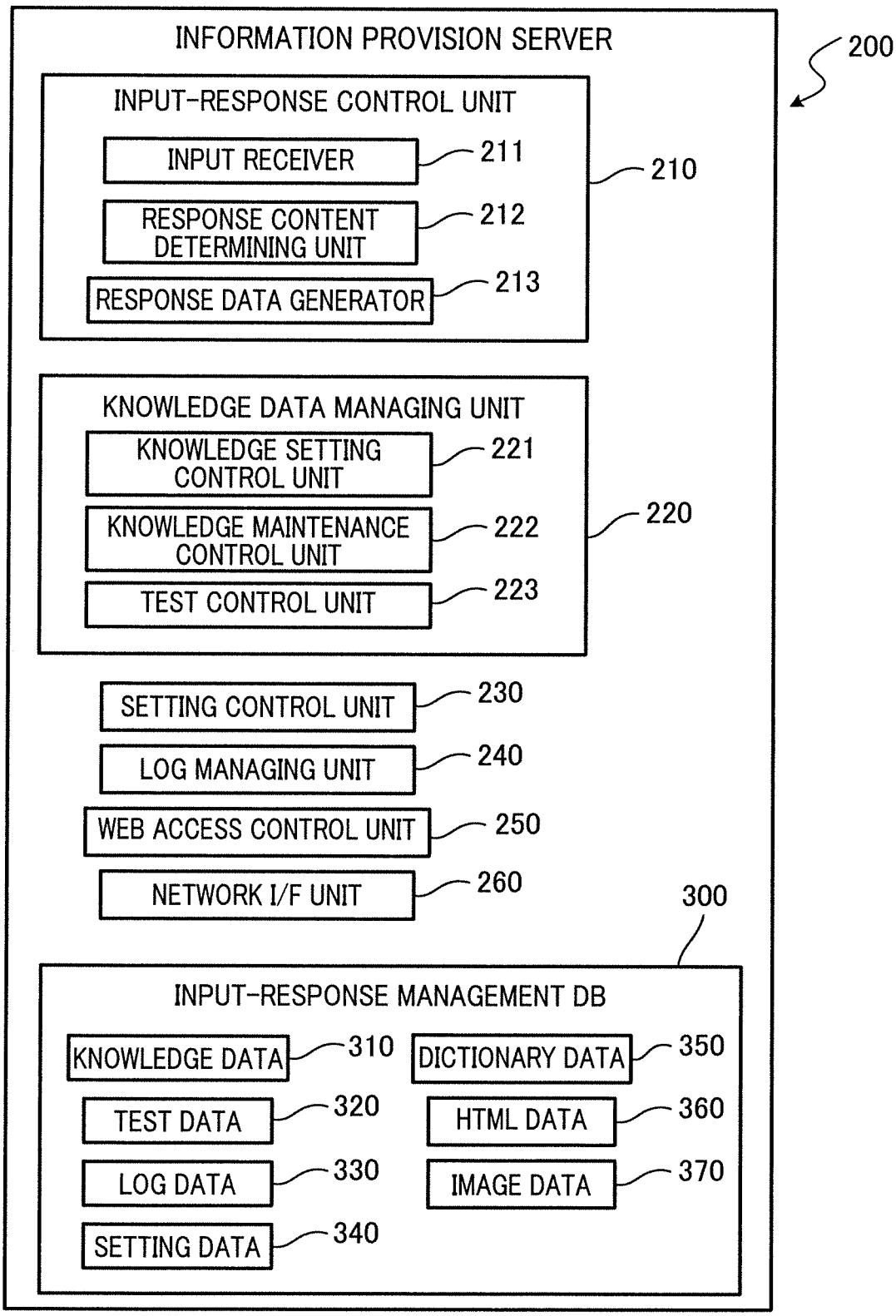
FIG. 4 is a functional block diagram of an information provision server.
Figure 5:
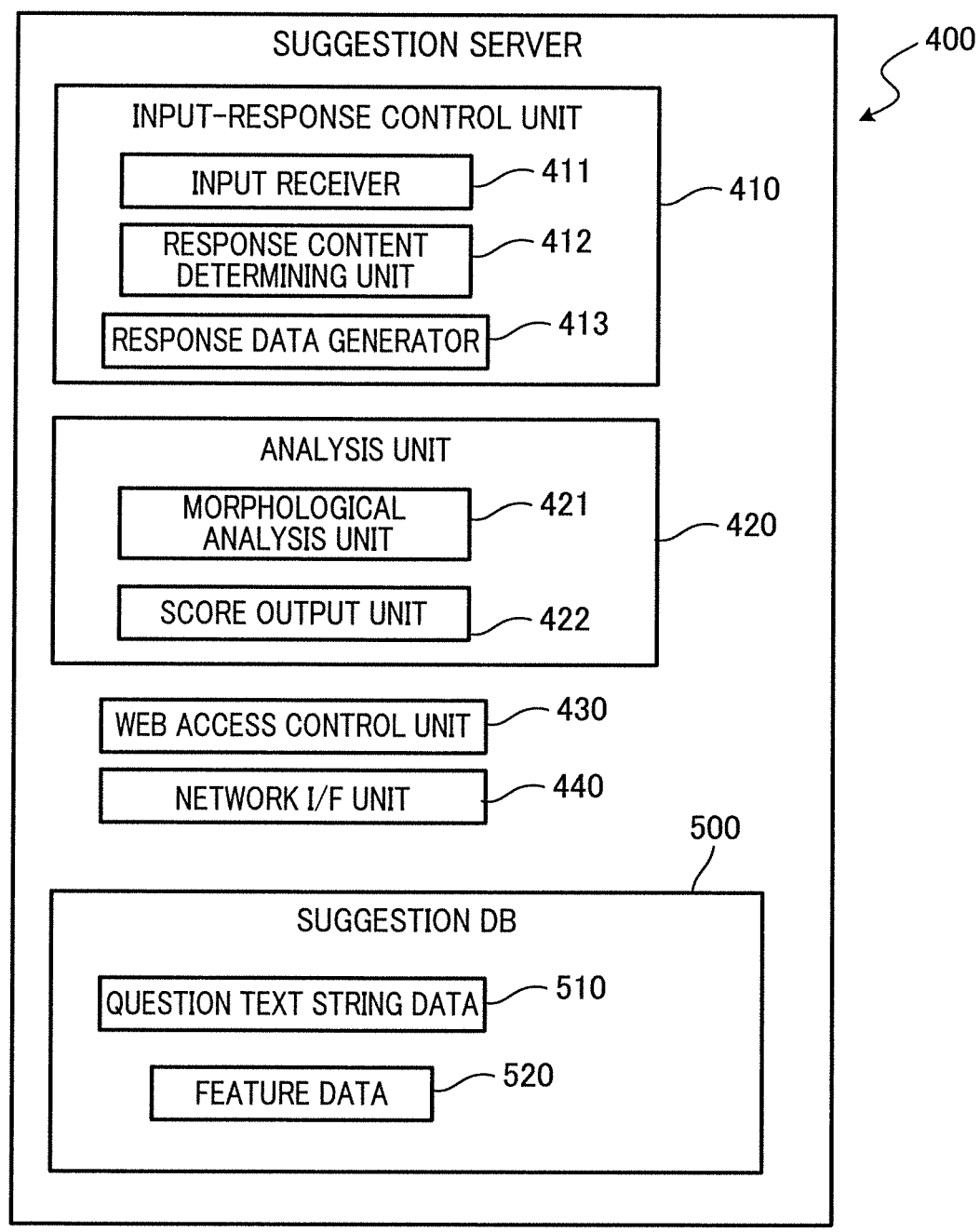
FIG. 5 is a functional block diagram of a suggestion server.

The following will describe components of the user terminal 100 and components of the information provision system 1, with reference to FIG. 3 to FIG. 5. FIG. 3 is a functional block diagram of the user terminal 100.

The user terminal 100 shown in FIG. 3 includes an input control unit 101, a web browser 102, and a network I/F (i.e., interface) unit 103.

When the user 10 operates input devices such as a mouse, keyboard, and touch panel connected to the user terminal 100, the input control unit 101 receives signals generated by this operation as input information. The web browser 102 displays a selected web page and sends input information supplied from the input control unit 101, to an input area in the web page. In accordance with operation (e.g., the input/update of an input text string and the pressing of the transmission button) by the user 10, a http request is sent to a web server (e.g., the information provision server 200 and the suggestion server 400) via the network I/F unit 103. The web browser 102 executes a script associated with a web page, and sends an input text string in the input area 113 to the suggestion server 400 each time a text string is input.

When sets of HTML data including response data, etc., are supplied from, e.g., the information provision server 200 of the information provision system 1 via the network I/F unit 103, the web browser 102 displays a web page (i.e., updates image display in the web browser) based on these sets of data.

The network I/F unit 103 accesses the network 700, and controls sending and receiving of sets of data to and from the information provision server 200 of the information provision system 1.

FIG. 4 is a functional block diagram of the information provision server 200 of the information provision system 1.

The information provision server 200 shown in FIG. 5 includes an input-response control unit 210, a knowledge data managing unit 220, a setting control unit 230, a log managing unit 240, a web access control unit 250, and a network I/F (i.e., interface) unit 260.

The input-response control unit 210 further includes an input receiver 211, a response content determining unit 212, and a response data generator 213. The knowledge data managing unit 220 includes a knowledge setting control unit 221, a knowledge maintenance control unit 222, and a test control unit 223.

The information provision server 200 includes the input-response management DB 300. The input-response management DB 300 includes knowledge data 310, test data 320, log data 330, setting data 340, dictionary data 350, HTML data 360, and image data 370.

Under a protocol such as http, the input receiver 211 of the input-response control unit 210 receives a text string over the network 700 and via the network I/F unit 260. The text string is input in the user terminal 100 by the user 10.

Based on a text string supplied to the input receiver 211, the response content determining unit 212 of the input-response control unit 210 selects a corresponding response content with reference to, e.g., the knowledge data 310 and the dictionary data 350 in the input-response management DB 300.

The response data generator 213 of the input-response control unit 210 generates response data so that a response content selected by the response content determining unit 212 is displayed in a web page on the web browser of the user terminal 100, and sends the data to the user terminal 100 via the web access control unit 250 and the network I/F unit 260 and over the network 700.

The knowledge setting control unit 221 of the knowledge data control unit 220 sets knowledge data in response to operation by a system administrator. In this regard, knowledge data is data in which a text string (i.e., input text) which is likely to be input by a user and a text string of a response which corresponds to this text string are designated in combination. The set knowledge data is stored in the knowledge data 310 of the input-response management DB 300.

The knowledge maintenance control unit 222 of the knowledge data control unit 220 performs the maintenance of sets of knowledge data in response to operation by the system administrator. In this maintenance, the correction of sets of knowledge data and the addition of another set of knowledge data are effectively and easily performed by using the log data 330 in the input-response management DB 300.

After the system administrator performs the maintenance of sets of knowledge data, the test control unit 223 of the knowledge data managing unit 220 performs simulation of operation of the user terminal 100 to check whether a response suitable for an input is output based on the sets of knowledge data for which the maintenance has been performed. The simulation is performed in the state in which the sets of knowledge data in the simulation are stored in the test data 320 of the input-response management DB 300. When there is no error in the sets of knowledge data, the sets of knowledge data are compiled. Subsequently, the knowledge data 310 is created again and is open to the public.

The setting control unit 230 performs the setting of the input-response screen 110 of FIG. 2 and the setting of a response content in a particular situation, in response to operation by the system administrator.

The log managing unit 240 keeps a log by recording a combination of an input in the user terminal 100 by the user 10 and a response of the information provision server 200 to the input, and in response to operation by the system administrator, the log managing unit 240 analyzes the log and displays a predetermined report on the system management terminal operated by the system administrator. The log is stored in the log data 330 of the input-response management DB 300.

When a http request is sent from the web browser of the user terminal 100 in response to operation by the user 10, the web access control unit 250 receives and analyzes the request, prepares data corresponding to the request, and sends the data to the web browser of the user terminal 100 as a http response. The data sent as the http response includes (i) response data generated by the response data generator 213 of the input-response control unit 210 and (ii) the HTML data 360 and image data 370 in the input-response management DB 300. The HTML data 360 is HTML data for displaying a web page. The image data 370 is data such as image data and video data which are used in a web page.

The network I/F (i.e., interface) unit 260 accesses the network 700, and controls sending and receiving of data to and from the user terminal 100, etc.

FIG. 5 is a functional block diagram of the suggestion server 400 of the information provision system 1.

The suggestion server 400 shown in FIG. 5 includes an input-response control unit 410, an analysis unit 420, a web access control unit 430, and a network I/F (i.e., interface) unit 440.

The input-response control unit 410 includes an input receiver 411, a response content determining unit 412, and a response data generator 413. The analysis unit 420 includes a morphological analysis unit 421 and a score output 4222.

The information provision server 400 includes a suggestion DB 500. The suggestion DB 500 includes question text string data 510 and feature data 520.

Under a protocol such as http, the input receiver 411 of the input-response control unit 410 receives an input text string over the network 700 and via the network I/F unit 440. The input text string is input in the user terminal 100 by the user 10.

The response content determining unit 412 of the input-response control unit 410 selects a question text string which satisfies a predetermined condition based on scores of candidates of question text strings, and determines the question text string as a corresponding response content. The scores are output by the analysis unit 420.

The response data generator 413 of the input-response control unit 410 generates response data so that a response content determined by the response content determining unit 412 is displayed in a web page on the web browser of the user terminal 100, and sends the data to the user terminal 100 via the web access control unit 430 and the network I/F unit 440 and over the network 700. In other words, the input-response control unit 410 functions as a response display unit configured to cause the user terminal 100 to display a question text string the score of which satisfies a predetermined condition among question text strings.

The morphological analysis unit 421 of the analysis unit 420 performs the morphological analysis for an input text string sent from the user 100. The morphological analysis unit 421 may perform the morphological analysis for question text strings stored in advance. The score output unit 422 calculates a score indicating to what extent each of question text strings is related to in input text string, based on results of the morphological analysis for the question text strings and a result of the morphological analysis for the input text string.

When a http request is sent from the web browser of the user terminal 100 in response to operation by the user 10, the web access control unit 430 receives and analyzes the request, prepares data corresponding to the request, and sends the data to the web browser of the user terminal 100 as a http response. The data sent as the http response includes response data generated by the response data generator 413 of the input-response control unit 410. The network I/F (i.e., interface) unit 440 accesses the network 700, and controls sending and receiving of data to and from the user terminal 100, etc.

The question text string data 510 in the suggestion DB 500 includes question text strings stored in the input-response management DB 300 of the information provision server 200. In the present embodiment, the question text string data 510 includes question text strings for which the morphological analysis has been performed in advance. However, the disclosure is not limited to this. For example, each time the score output unit 422 compares an input text string with question text strings, the morphological analysis unit 421 may perform the morphological analysis for the question text strings.

The feature data 520 in the suggestion DB 500 includes sets of machine learning data which are used by the score output unit 422 to compare an input text string with each of question text strings and which relate to plural types of features. The feature data 520 is model data created from sets of learning data by machine learning in advance. The score output unit 422 outputs, for each data in the feature data 520, feature values each indicating how one question text string is related to an input text string in regard to a feature and also outputs a total value of these values as a score of a combination of the input text string and the question text string. In the present embodiment, each data in the feature data is identified by a feature name of the data. The learning method of the machine learning can adopt a known learning method such as binary classification and supervised learning. The algorithm and optimization algorithm of the machine learning can adopt a known algorithm such as support vector machine and coordinate descent.

Although not illustrated, the user terminal 100, the information provision server 200, and the suggestion server 400 are computers the hardware of which is configured to include (i) a CPU, a non-transitory computer-readable recording medium such as a RAM and a ROM which store sets of above-described data and programs, (iii) an input device, (iv) a display device, etc. The programs of later-described flowcharts are stored in such a recording medium, and mainly executed by the CPU. In other words, the programs cause the information provision system 1 including the CPU and the recording medium to execute processes which are included in these various programs. As such, the processes and operations of the information provision system 1 can be interpreted as those of a program or an information provision method.

Figure 6:
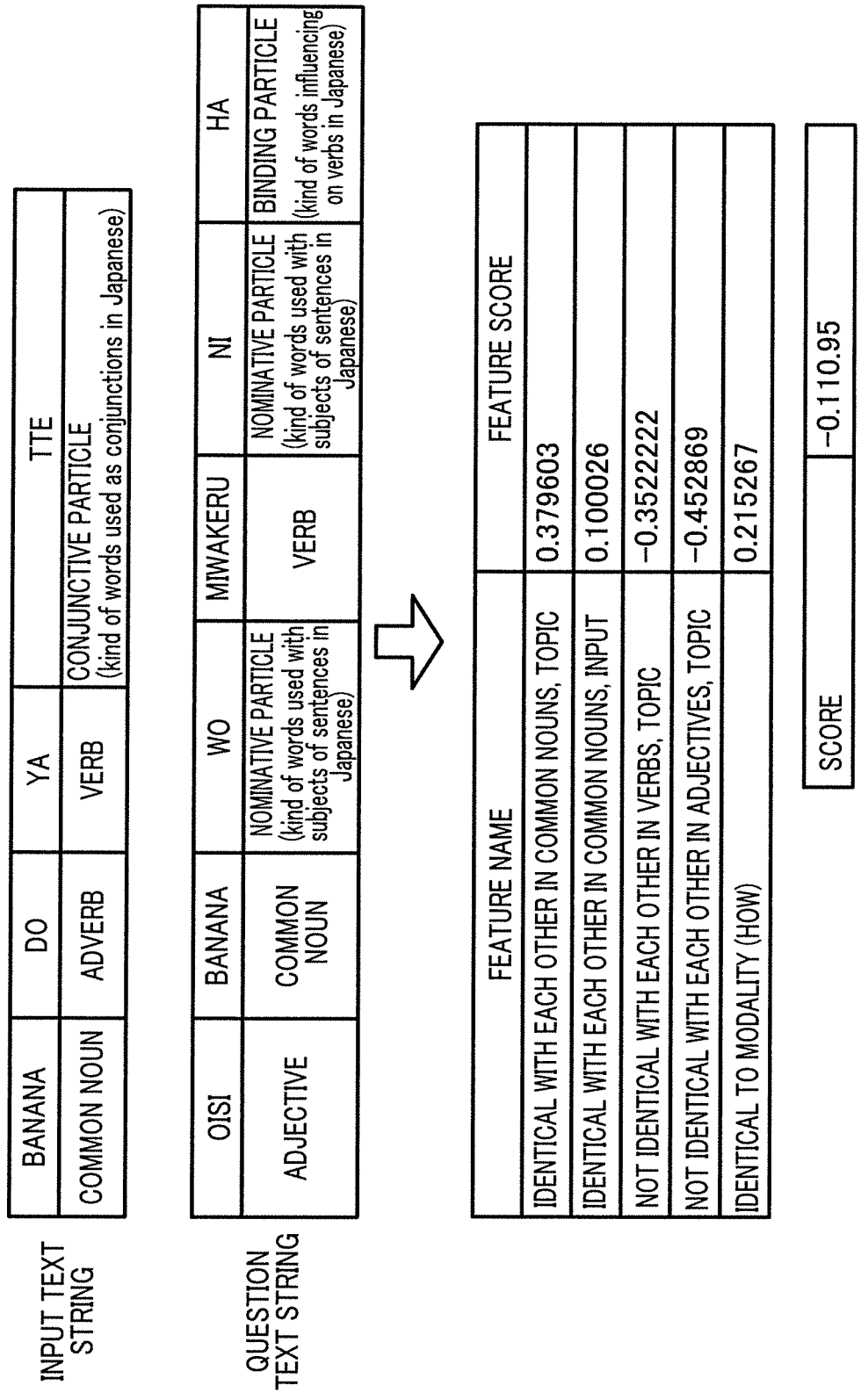
FIG. 6 is an explanatory diagram showing an example output of scores.

The following will describe an example output of scores by the suggestion server 400, with reference to FIG. 6. As shown in FIG. 6, the following describes a case where a text string "banana do ya tte (bananas how to)" is input as an input text string and compared with a text string "oisi banana wo miwakeru ni ha (how to find delicious bananas)" (i.e., question text string).

To begin with, the morphological analysis is performed for the input text string and the question text string. In the present embodiment, question text strings for which the morphological analysis has been performed in advance are stored in the question text string data 510 of the suggestion DB 500. In FIG. 6, the following items are used as compared features (i.e., features for which feature scores are output; a feature score is a value calculated for each feature): "identical with each other in common nouns, TOPIC"; "identical with each other in common nouns, INPUT"; "not identical with each other in verbs, TOPIC"; "not identical with each other in adjectives, TOPIC"; and "identical with each other in modality (HOW)". In addition to that, a feature value (i.e., feature score) is output for each item.

The "identical with each other in common nouns, TOPIC" is a feature indicating that the input text string is identical with the question text string in regard to common nouns. When the "identical with each other in common nouns, TOPIC" is satisfied, "0.379603" is output as a feature score of this feature. The "identical with each other in common nouns, INPUT" is a feature indicating that the question text string is identical with the input text string in regard to common nouns. When the "identical with each other in common nouns, INPUT" is satisfied, "0.100026" is output as a feature score of this feature. The "not identical with each other in verbs, TOPIC" is a feature indicating that the input text string is not identical with the question text string in regard to verbs (or indicating that there is no verb). When the "not identical with each other in verbs, TOPIC" is satisfied, "−0.3522222" is output as a feature score of this feature. The "not identical with each other in adjectives, TOPIC" is a feature indicating that the input text string is not identical with the question text string in regard to verbs (or indicating that there is no verb). When the "not identical with each other in adjectives, TOPIC" is satisfied, "−0.452869" is output as a feature score of this feature. As such, the input text string and the question text string are compared with each other for each part-of-speech. As a result, the feature scores are output.

The "identical with each other in modality (HOW)" is a feature indicating that the input text string and the question text string include vertical expressions asking the way of something. When the "identical with each other in modality (HOW)" is satisfied, "0.215267" is output as a feature score of this feature. As such, the input text string and the question text string may be compared with each other in regard to a category of grammar such as the modality so as to output the feature scores.

Although not illustrated, the example features are as follows. Examples of information indicating whether text strings are identical with each other in regard to expression information used to compare the text strings in regard to each part-of-speech, which are compared with each other for each part-of-speech, include a feature "not identical with each other in common nouns" indicating that text strings are not identical with each other in common nouns. Examples of sets of information indicating whether text strings are identical with each other in regard to subjects, predicates, starts, and destinations include a feature "start is opposite", a feature "destination is opposite", etc. To be more specific, when a question text string is a text string "Tokyo kara Kyoto he (from Tokyo to Kyoto)" and an input text string is a text string "Kyoto kara Tokyo he (from Kyoto to Tokyo)", these text strings are identical with each other in regard to common nouns. However, these text strings satisfy the feature "start is opposite" and the feature "destination is opposite".

Examples of information indicating that whether text strings are identical with each other in regard to the category of grammar such as the tense, aspect, modality, and voice include a feature "will and order". To be more specific, when a question text string is a text string "hasiritai (want to run)" and an input text string is a text string "hasire (run)", these text strings are identical with each other in regard to verbs. However, these text strings satisfy the feature "will and order". In other words, these text strings are not identical with each other in regard to the modality. Therefore, a negative value is output.

Although not illustrated, the following describes an input text string and a question text string which are different from the above-described text strings. For example, the following describes a case where an input text string is a text string "kawa de BBQ wo sitai (want to have a BBQ by the river)" and a question text string is a text string "asita, kawa de babekyu wo sitai (want to have a barbeque tomorrow)".

In this case, the input text string and the question text string are identical with each other in regard to common nouns ("kawa", i.e., "river"). Therefore, these text strings satisfy the features "identical with each other in common nouns, TOPIC" and "identical with each other in common nouns, INPUT". In addition to that, with reference to an N dictionary, the input text string and the question text string are identical with each other also in regard to common nouns ("BBQ" and "babekyu", i.e., "BBQ" and "barbeque"). Therefore, these text strings also satisfy the features "same meaning in common nouns, TOPIC, with N dictionary" and "same meaning in common nouns, INPUT, with N dictionary". In addition to that, the input text string and the question text string are identical with each other also in regard to ends of these text strings ("wo sitai", i.e., "want to"). Therefore, these text strings also satisfy the features "identical with each other in compound words, TOPIC, and non-independent compound word is STOPWORD" and "identical with each other in compound words, INPUT, and non-independent compound word is STOPWORD". In this regard, a compound word is word which is used to be conjunct with other words, and non-independent compound word is a word which cannot be used by itself and which is used to be conjunct with other words. In other words, "si" out of "sitai" in the input and output text strings is a non-independent potential verb and is used to be conjunct with "tai", which is an auxiliary verb used in STOPWORD, out of "sitai". In this regard, the non-independent potential verb is a verb which cannot be used by itself and which expresses potential, and the STOPWORD indicates a dictionary form. Furthermore, with reference to the N dictionary, the input text string and the question text string are identical with each other in regard to objects ("BBQ" and "babekyu", i.e., "BBQ" and "barbeque"). Therefore, these text strings also satisfy the features "same meaning in objects, TOPIC, with N dictionary" and "same meaning in objects, INPUT, with N dictionary". Furthermore, the input text string and the question text string are identical with each other also in regard to places ("kawa", i.e., "river"). Therefore, these text strings also satisfy the features "identical with each other in places, TOPIC" and "identical with each other in places, INPUT". Furthermore, a modifier ("asita,", i.e., "tomorrow") indicating "when" is included only in the question text string. Therefore, this satisfies the feature "not identical with each other in morphemes and modifier is only in TOPIC". Furthermore, a word indicating the will ("sitai", i.e., "want to") is included in the input and question text strings. Therefore, these text strings also satisfy the feature "identical with each other in modality (will)".

As such, the suggestion server 400 creates a model, indicating features, from sets of learning data by using the machine learning in advance and calculates feature values for each question text string by using this model. The suggestion server 400 then calculates a score of each question text string, and sends a question text string the score of which satisfies a predetermined condition (i.e., which is higher than a predetermined threshold value) to the user terminal 100. In the present example, the meaning of the input text string is comparable with the meaning of each of question text strings, for example, in regard to what extent the meaning of each of the question text strings is similar to the meaning of the input text string, by using the above-described score.

The following will describe a knowledge data table stored in the input-response management DB 300 of the information provision server 200, with reference to FIG. 7. As shown in FIG. 7, the knowledge data table includes an identification information column, a question-text string column, and a response-text string column. The identification information column stores information for identifying each question text string in association with a later-described question data table (see FIG. 8). The question-text string column stores question text strings which can be displayed in the suggestion area 118 as candidates of a question for an input text string. The response-text string column stores text strings which are sets of knowledge data corresponding to question text strings.

The following will describe the question data table stored in the suggestion DB 500 of the suggestion server 400, with reference to FIG. 8. As shown in FIG. 8, the question data table includes an identification information column, a question-text string column, and a morpheme column. The identification information column stores information for identifying each question text string in association with the above-described knowledge data table (see FIG. 7). The question-text string column stores question text strings which can be displayed in the suggestion area 118 as candidates of a question for an input text string. The morpheme column stores results of the morphological analysis which is performed for question text strings.

Figure 9:
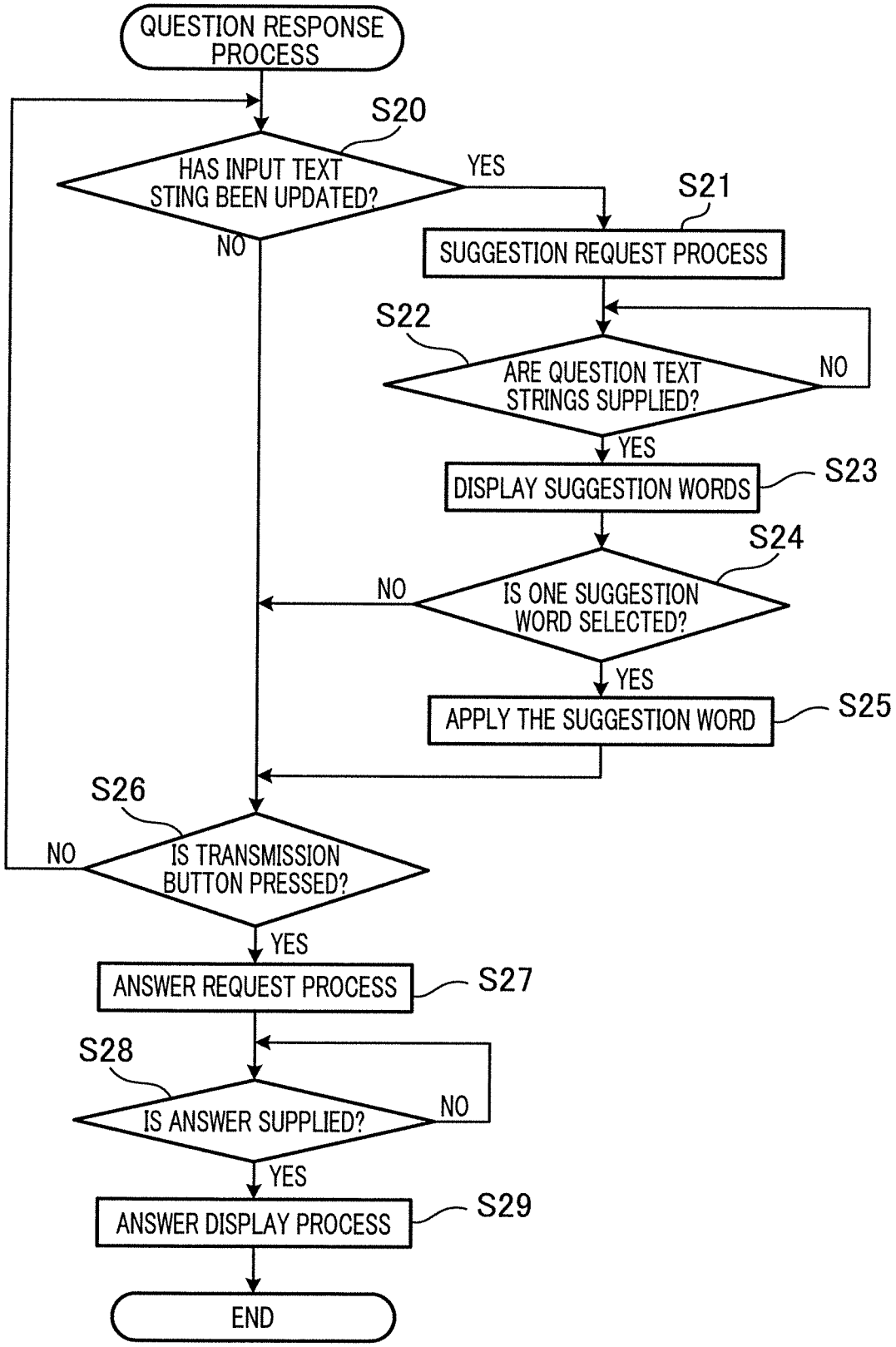
FIG. 9 is a flowchart of an input-response screen control process.

FIG. 9 is a flowchart of an input-response screen control process which is executed by the web browser 102 of the user terminal 100. The input-response screen control process is executed after the input-response screen (see FIG. 2) is requested and displayed.

To begin with, the web browser 102 determines whether an input text string in the input area 113 has been updated by the user 10 (step S20). When the input text string has been updated (YES in S20), the web browser 102 executes a suggestion request process (step S21). To be more specific, the web browser 102 sends the input text string for which the determination has been performed in the step S20 to the suggestion server 400. After the step S21, the web browser 102 determines whether question text strings are supplied from the suggestion server 400 (step S22). When the question text strings are not supplied from the suggestion server 400 (NO in S22), the web browser 102 executes the step S22 again. Meanwhile, when the question text strings are supplied from the suggestion server 400, the web browser 102 displays the supplied question text strings as suggestion words in the suggestion area 118 (step S23).

After the step S23, the web browser 102 determines whether one of the suggestion words displayed in the step S23 is selected (step S24). When one of the suggestion words has been selected (YES in S24), the web browser 102 applies the selected suggestion word to the input text string in the input area 113 (step S25).

After the step S25, when the input text string has not been updated in the step S20 (NO in S20) or when any one of the suggestion words has not been selected in the step S24 (NO in S24), the web browser 102 determines whether the transmission button 114 is pressed (S26). When the transmission button 114 is not pressed (NO in S26), the web browser 102 shifts the process to the step S20.

Meanwhile, when the transmission button 114 has been pressed, the web browser 102 executes an answer request process (step S27). To be more specific, the web browser 102 sends the input text string in the input area 113 to the information provision server 200. After the step S27, the web browser 102 determines whether an answer is supplied from the information provision server 200 (step S28). When the answer is not supplied from the information provision server 200 (NO in S28), the web browser 102 executes the step S26 again. When the answer is supplied from the information provision server 200 (NO in S28), the web browser 102 displays the supplied answer in the response display area 112 (step S29).

Figure 10:
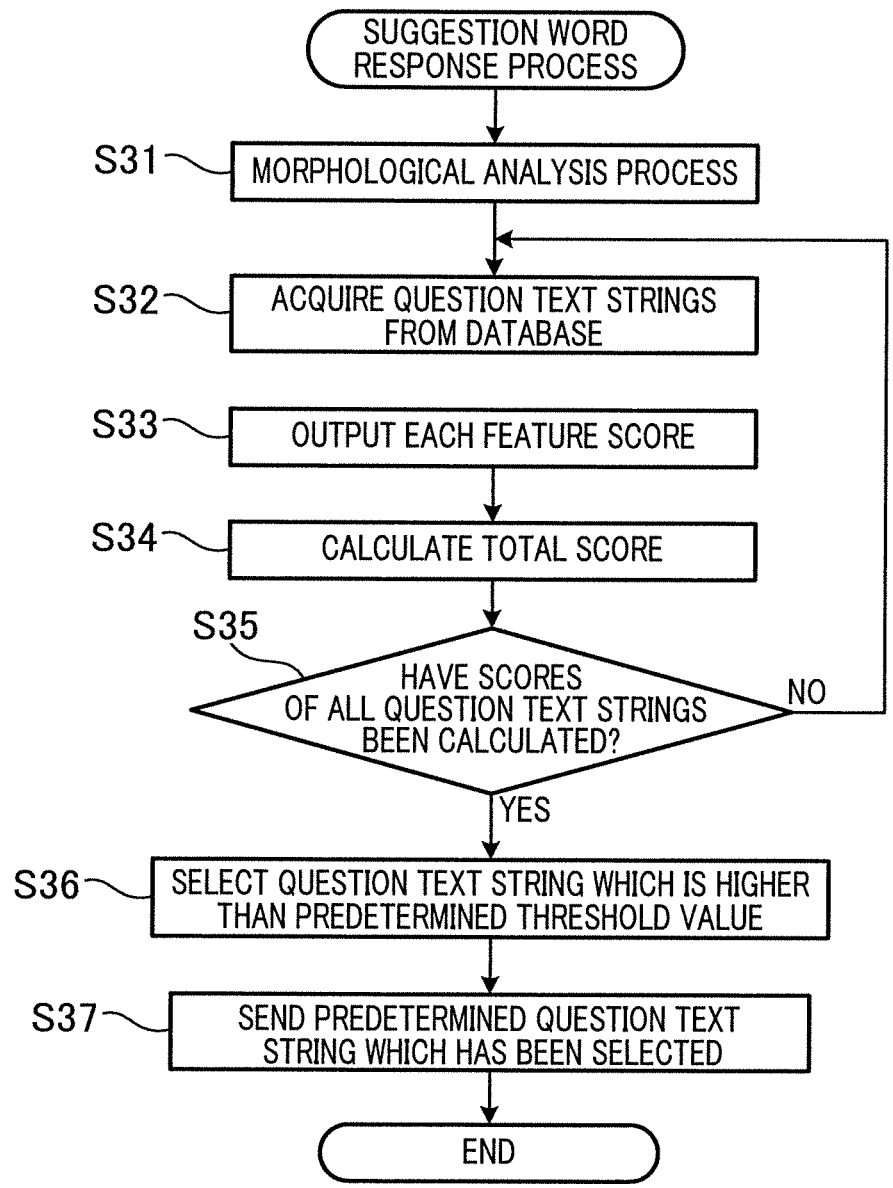
FIG. 10 is a flowchart of a suggestion-word response process.

FIG. 10 is a flowchart of a suggestion word response process executed by the input-response control unit 410 of the suggestion server 400. The suggestion word response process is executed in a case where the suggestion request process (see FIG. 9) has been executed by the web browser 102 and the input text string has been sent to the suggestion server 400 from the user terminal 100.

To begin with, when the input text string is supplied from the user terminal 100, the input-response control unit 410 causes the analysis unit 420 to execute a morphological analysis process (step S31). Subsequently, the input-response control unit 410 causes the score output unit 422 to acquire question text strings from a question database (see FIG. 8) based on a result of the morphological analysis (step S32). After that, the input-response control unit 410 causes the score output unit 422 to select features corresponding to a combination of the input text string and each of the acquired question text strings and to output a feature score of each of the features (step S33). After that, the input-response control unit 410 causes the score output unit 422 to calculate a total value of the feature scores to acquire a score of each of the compared question text strings (step S34).

Subsequently, the input-response control unit 410 determines whether the score output unit 422 has calculated scores of all question text strings stored in the question database (see FIG. 8; step S35). When the scores of all question text strings are not calculated (NO in S35), the input-response control unit 410 causes the score output unit 422 to execute the step S32. When the scores of all question text strings have been calculated (YES in S35), the input-response control unit 410 selects a question text string, the score of which is higher than a predetermined threshold value, from among the question text strings for which the scores have been calculated (step S36). After that, the input-response control unit 410 sends the selected question text string to the user terminal 100 which has sent the input text string (step S37).

Although not illustrated, when the information provision server 200 receives an input text string in the answer request process (see FIG. 9) executed by the web browser 102, the information provision server 200 executes a known process in which a suitable answer is searched for based on the input text process and the answer is sent to the web browser 102. In this regard, when the input text string sent to the information provision server 200 is a suggestion word which has been selected, the input text string is completely identical with one of question text strings stored in the knowledge data 310, with the result that the information provision system 1 can present a suitable answer for the user 10.

Further, the detailed description above is mainly focused on characteristics of the present invention to for the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

REFERENCE SIGNS LIST 1 information provision system
10 user
100 user terminal
200 information provision server
300 input-response management DB
400 suggestion server
500 suggestion DB
700 network

The invention claimed is:

1. An information provision system comprising:
    a knowledge data storage unit configured to store, in advance, question text strings each of which is associated with a response content;
    a receiver which is configured to receive an input text string input via a user terminal;
    a morphological analysis unit which is configured to perform morphological analysis for the input text string and each of the question text strings;
    a question data storage unit configured to store the question text strings associated with results of a morphological analysis performed in advance;
    a score output unit which is configured to calculate a score indicating to what extent each of the question text strings is related to the input text string, based on results of the morphological analysis performed for the question text strings in advance and based on a result of the morphological analysis for the input text string; and
    a response display unit which is configured to select at least one of the question text strings and to cause the user terminal to display the at least one of the question text strings, a score of the at least one of the question text strings being higher than a threshold value,
    the score output unit being configured to:
        select at least one feature corresponding to a combination of the input text string and acquired one of the question text strings based on the results of the morphological analysis performed for the question text strings in advance and based on the result of the morphological analysis performed for the input text string; and,
        calculate a score for the each of the question text strings from a total value which is calculated by using at least one of models indicating plural types of features created by learning data in advance and which indicates that how the input text string is related to the each of the question text strings in terms of the selected at least one feature.

2. The information provision system according to claim 1, wherein, update of the input text string by the user is monitored,
    each time the monitored input text string is updated, an updated input text string is sent to the receiver, and
    each time one of the question text strings is sent from a transmitter, the one of the question text strings is selectably displayed.

3. The information provision system of claim 1, wherein the plural types of features include at least one feature indicating that the input text string and at least one of the question text strings have the same morphemes.

4. The information provision system of claim 3, wherein the score is calculated and output as a result of a comparison of the input text string and the at least one of the question text strings, the comparison based on a comparison of a sub-unit of the input text string and a sub-unit of the at least one question text strings.

5. The information provision system of claim 4, wherein the sub-unit of the input text string and the sub-unit of the at least one of the question text strings is associated with a part of speech.

6. The information provision system of claim 5, wherein the sub-unit is at least one of a verb or a noun.

7. The information provision system of claim 5, wherein the sub-unit is at least one of a modality.

8. The information provision system of claim 3, wherein the plural types of features include one or more of a noun, a verb, an adjective, tense, or a modality.

9. An information provision method comprising the steps of:
    storing, in advance, in a knowledge data storage unit, question text strings each of which is associated with a response content;
    receiving an input text string from a user terminal;
    performing morphological analysis of the input text string and each of the question text strings, each of the question text strings associated with results of a morphological analysis performed in advance and stored in a question data storage unit;
    calculating a score indicating to what extent each of the question text strings is related to the input text string, based on results of the morphological analysis performed for the question text strings in advance and based on a result of the morphological analysis for the input text string; and
    causing the user terminal to:
        select at least one feature corresponding to a combination of the input text string and acquired one of the question text strings based on the results of the morphological analysis performed for the question text strings in advance and based on the result of the morphological analysis performed for the input text string;
        calculate a score for the each of the question text strings from a total value which is calculated by using at least one of models indicating plural types of features created by learning data in advance and which indicates how the input text string is related to the each of the question text strings in terms of the selected at least one feature; and,
        display at least one of the question text strings, the score of the at least one of the question text strings satisfying a predetermined condition.

* * * * *